United States Patent
Delacourt et al.

(10) Patent No.: US 11,989,945 B2
(45) Date of Patent: May 21, 2024

(54) METHOD FOR ASSISTING WITH THE DETECTION OF ELEMENTS, ASSOCIATED DEVICE AND PLATFORM

(71) Applicant: THALES, Courbevoie (FR)

(72) Inventors: Dominique Delacourt, Elancourt (FR); Olivier Cocle, Elancourt (FR); Olivier Verdy, Elancourt (FR); Dominique Bon, Elancourt (FR); Ludovic Perruchot, Elancourt (FR); Alain Le Meur, Elancourt (FR); Frédéric Le Gusquet, Elancourt (FR)

(73) Assignee: THALES, Courbevoie (FR)

( * ) Notice: Subject to any disclaimer, the term of this patent is extended or adjusted under 35 U.S.C. 154(b) by 85 days.

(21) Appl. No.: 17/909,218

(22) PCT Filed: Mar. 3, 2021

(86) PCT No.: PCT/EP2021/055355
§ 371 (c)(1),
(2) Date: Sep. 2, 2022

(87) PCT Pub. No.: WO2021/175930
PCT Pub. Date: Sep. 10, 2021

(65) Prior Publication Data
US 2023/0088783 A1    Mar. 23, 2023

(30) Foreign Application Priority Data
Mar. 3, 2020   (FR) ...................................... 20 02127

(51) Int. Cl.
*G06V 20/00* (2022.01)
*G06V 10/143* (2022.01)
(Continued)

(52) U.S. Cl.
CPC ............ *G06V 20/56* (2022.01); *G06V 10/143* (2022.01); *G06V 10/147* (2022.01); *G06V 10/22* (2022.01);
(Continued)

(58) Field of Classification Search
CPC .... G06V 20/56; G06V 10/143; G06V 10/147; G06V 10/22; G06V 10/74; G06V 10/764;
(Continued)

(56) References Cited

U.S. PATENT DOCUMENTS 4,241,456 A * 12/1980 Nakagaki ............... G08C 23/04
                                                         398/208
8,294,808 B2 * 10/2012 Caron .................... G02B 23/12
                                                          348/344
(Continued)

FOREIGN PATENT DOCUMENTS

CA        2140681        12/1995

OTHER PUBLICATIONS

International Search Report for PCT/EP2021/055355 dated Mar. 31, 2021.
Preliminary Search Report for FR 20022127 dated Oct. 9, 2020.

*Primary Examiner* — Frank F Huang
(74) *Attorney, Agent, or Firm* — B. Aaron Schulman, Esq.; Stites & Harbison, PLLC

(57) ABSTRACT

The present invention relates to a method for assisting in the detection of elements in an environment, comprising:
  the acquisition of a first wide-field image of an environment by a first sensor (14A) having a first field of view and a first resolution,
  the generation of a fused image from first narrow-field images of the environment acquired by a second sensor (14B) having a second field of view strictly less than the first field of view and a second resolution finer than the first resolution, (Continued)

Figure 1:
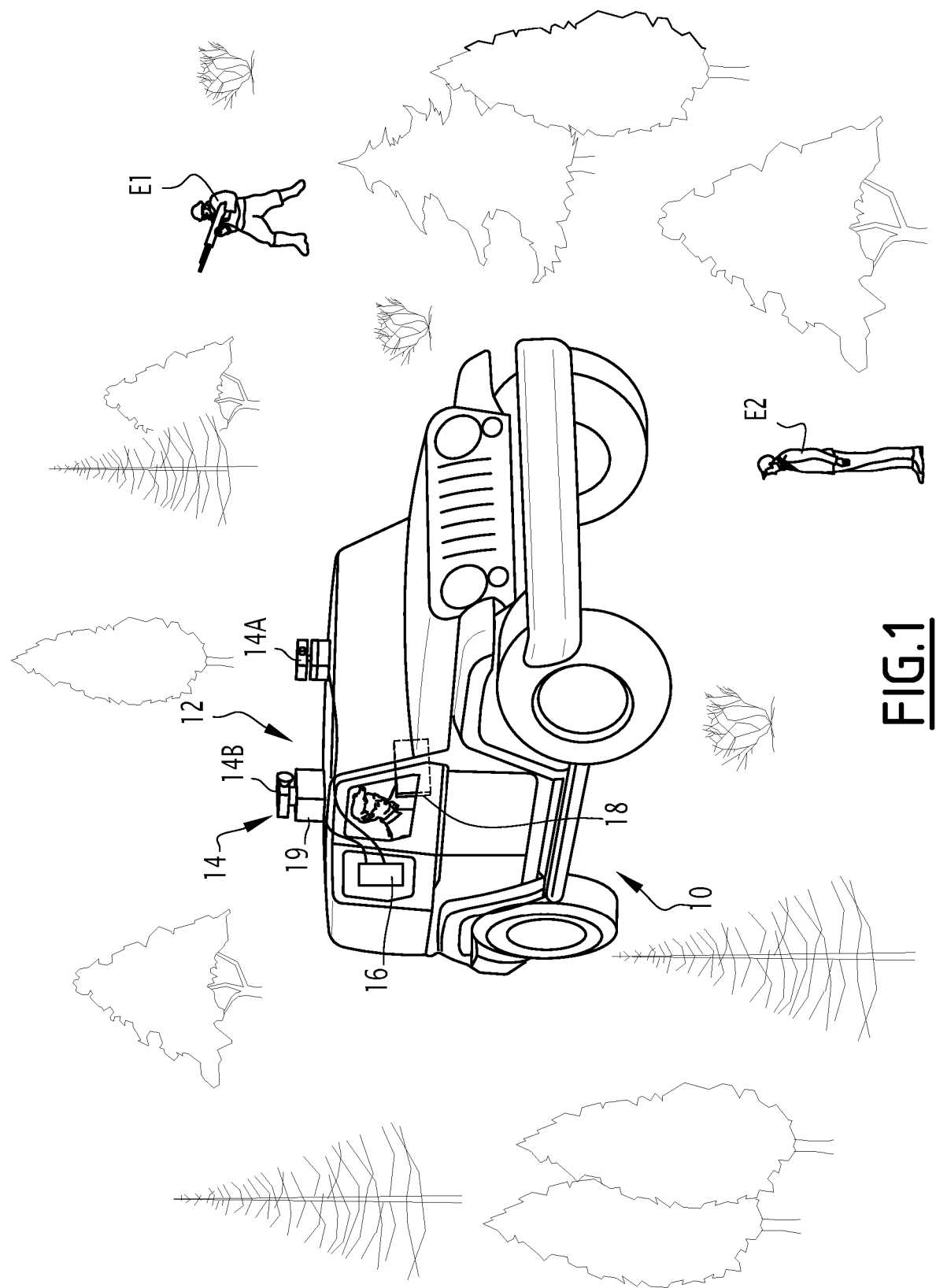

In response to the detection of a difference relating to an element on a second wide-field image acquired by the first sensor (14A), compared to the first wide-field image, the acquisition of a second narrow-field image imaging the difference, and the update the fused image with the second narrow-field image.

13 Claims, 3 Drawing Sheets

(51) Int. Cl.

| | |
|---|---|
| *G06V 10/147* | (2022.01) |
| *G06V 10/22* | (2022.01) |
| *G06V 10/74* | (2022.01) |
| *G06V 10/764* | (2022.01) |
| *G06V 20/52* | (2022.01) |
| *G06V 20/56* | (2022.01) |
| *G06V 20/58* | (2022.01) |
| *H04N 23/45* | (2023.01) |
| *H04N 23/698* | (2023.01) |
| *H04N 23/951* | (2023.01) |
| *G06V 10/10* | (2022.01) |

(52) U.S. Cl.
CPC ............ *G06V 10/74* (2022.01); *G06V 10/764* (2022.01); *G06V 20/52* (2022.01); *G06V 20/58* (2022.01); *H04N 23/45* (2023.01); *H04N 23/698* (2023.01); *H04N 23/951* (2023.01); *G06V 10/16* (2022.01); *G06V 2201/07* (2022.01)

(58) Field of Classification Search
CPC ........ G06V 20/52; G06V 20/58; G06V 10/16; G06V 2201/07; H04N 23/45; H04N 23/698; H04N 23/951
See application file for complete search history.

(56) References Cited

U.S. PATENT DOCUMENTS

| | | | | |
|---|---|---|---|---|
| 9,194,954 | B2 * | 11/2015 | Simon | G01C 11/34 |
| 2002/0009978 | A1 * | 1/2002 | Dukach | G08G 1/01 |
| | | | | 455/457 |
| 2002/0034067 | A1 * | 3/2002 | Massaro | G06F 3/147 |
| | | | | 361/728 |
| 2003/0136832 | A1 * | 7/2003 | Massaro | A47F 5/0068 |
| | | | | 235/383 |
| 2004/0195774 | A1 * | 10/2004 | Segan | G04B 47/048 |
| | | | | 273/359 |
| 2006/0082642 | A1 * | 4/2006 | Wang | H04N 7/142 |
| | | | | 348/14.05 |
| 2007/0049159 | A1 * | 3/2007 | Kulis | A63H 17/28 |
| | | | | 446/438 |
| 2007/0078566 | A1 * | 4/2007 | Wang | A61B 34/70 |
| | | | | 700/259 |
| 2007/0103890 | A1 * | 5/2007 | Morehead | A01K 27/006 |
| | | | | 362/103 |
| 2007/0228755 | A1 * | 10/2007 | Alvarado | B62D 41/00 |
| | | | | 340/425.5 |
| 2007/0291128 | A1 * | 12/2007 | Wang | H04N 7/185 |
| | | | | 901/1 |
| 2009/0125147 | A1 * | 5/2009 | Wang | G06T 7/0012 |
| | | | | 715/764 |
| 2010/0010672 | A1 * | 1/2010 | Wang | B25J 9/1697 |
| | | | | 901/1 |
| 2018/0005176 | A1 * | 1/2018 | Williams | G06Q 10/087 |
| 2023/0088783 | A1 * | 3/2023 | Delacourt | G06V 20/52 |
| | | | | 348/148 |

* cited by examiner

| IMPC1 | IMPC1 | IMPC1 | IMPC1 | IMPC1 |
|---|---|---|---|---|
| IMPC1 | IMPC1 | IMPC1 | IMPC1 | IMPC1 |
| IMPC1 | IMPC1 | IMPC1 | IMPC1 | IMPC1 |
| IMPC1 | IMPC1 | IMPC1 | IMPC1 | IMPC1 |
| IMPC1 | IMPC1 | IMPC1 | IMPC1 | IMPC1 |
| IMPC1 | IMPC1 | IMPC1 | IMPC1 | IMPC1 |

FIG.3

METHOD FOR ASSISTING WITH THE DETECTION OF ELEMENTS, ASSOCIATED DEVICE AND PLATFORM

The present invention relates to a method for assisting in the detection of elements in an environment. The present invention further relates to an associated detection assistance device, and a platform comprising such device.

In the military field, combat vehicle crews are exposed to many threats. Such threats come in particular from disembarked combatants, from land or airborne vehicles and from land or airborne drones.

In order to identify such threats, certain reconnaissance missions consist of approaching the enemy as close as possible so as to detect the device thereof, in particular the type of combat gear used, and to determine precisely the strength and identification of the enemy. The challenge is to see without being seen, and to send as much tactical information as possible to the command post Nevertheless, the threats are visible to a greater or lesser extent, depending on the level of camouflage that the environment can provide, since the latter can be an urban, rural, mountain or even forest environment.

Furthermore, armored vehicles give the vehicle crew a field of view which can be very limited.

In addition, the workload, as well as the level of fatigue of the crew, are likely to lead to a loss of vigilance with regard to the external environment of the vehicle.

All these contribute to the crews being exposed to threats which the crews have not systematically seen and anticipated.

There is thus a need for a detection assistance method for a better detection of the elements of an environment, and in particular of threats in a military context.

To this end, the subject matter of the invention is a method for assisting in the detection of elements in an environment, the method being implemented by a detection assistance device comprising an image acquisition device and a computer, the image acquisition system comprising a first sensor and a second orientable sensor, the first sensor having a first field of view and a first resolution and being suitable for acquiring so-called wide-field images, the second sensor having a second field of view and a second resolution and being suitable for acquiring so-called narrow-field images, the second field of view being strictly less than the first field of view, the second resolution being finer than the first resolution, the method comprising:
  an initialization phase comprising:
    i. the acquisition by the first sensor of a first wide-field image of a first part of the environment,
    ii. the scanning of the environment by the second sensor so as to acquire a series of first narrow-field images imaging different second parts of the environment so that all the second parts of the environment imaged by the first narrow-field images correspond to the first part of the environment imaged by the first wide-field image,
    iii. the generation by the computer of a fused image from the series of first narrow-field images, the fused image imaging the first part of the environment with a resolution equal to the second resolution,
  an operating phase comprising at each moment:
    i. the acquisition by the first sensor of a second wide-field image of the first part of the environment,
    ii. in response to the detection of at least one difference relating to an element on the second wide-field image compared to the wide-field image acquired at the previous moment, the acquisition by the second sensor, for each detected difference, of a second narrow-field image displaying the difference with the second resolution, and
    iii. for each difference detected, the update by the computer, of the corresponding part of the fused image with the corresponding second narrow-field image.

According to other advantageous aspects of the invention, the assistance method for detection comprises one or a plurality of the following features, taken individually or according to all technically possible combinations:
  the system of assistance for detection comprises a display, the method comprising a step of displaying the fused image on the display according to the last update of said fused image;
  when a difference is detected on the second wide-field image compared to the wide-field image acquired at the previous instant, the update comprises the update of the fused image with the second wide-field image, the time for the second sensor to acquire the corresponding second narrow-field image, and for the computer to update the fused image with said second narrow-field image;
  the update of the fused image comprises the insertion of the second narrow-field image instead of the portion of the fused image imaging the same field of view as said second narrow-field image;
  each second narrow-field image inserted in the fused image is associated with a date of acquisition of the second narrow-field image, the date of acquisition being stored in the computer;
  when at least two differences corresponding to two different moving elements are detected, the corresponding second narrow-field images are acquired over time following the same order, the fused image being updated by the second narrow-field images according to the order of acquisition of said second narrow-field images;
  the initialization phase comprises, where appropriate, the detection by the computer, of elements imaged on the fused image and/or on the first wide-field image and the classification by the computer of the detected elements;
  the operating phase comprises the classification by the computer, of the elements corresponding to the differences identified on the second wide-field image.

The invention further relates to a system for assisting in the detection of elements in an environment, the device comprising:
  an image acquisition system comprising a first sensor and a second orientable sensor, the first sensor having a first field of view and a first resolution and being suitable for acquiring so-called wide-field images, the second sensor having a second field of view and a second resolution and being suitable for acquiring so-called narrow-field images, the second field of view being strictly less than the first field of view, the second resolution being finer than the first resolution, the image acquisition system being configured for implementing at least the steps of acquiring a first wide-field image, of performing a scan, of acquiring a second wide-field image and of acquiring a second narrow-field image from the method as described above,
  a computer configured for implementing the steps of generating a fused image, of detecting differences and of updating the method as described above. As an optional addition, the first sensor and the second sensor each being suitable for acquiring the corresponding images in at least two different spectral bands, such as the visible spectral band and the infrared spectral band.

The invention further relates to a platform, in particular a mobile platform such as a vehicle, comprising a device as described above.

Figure 2:
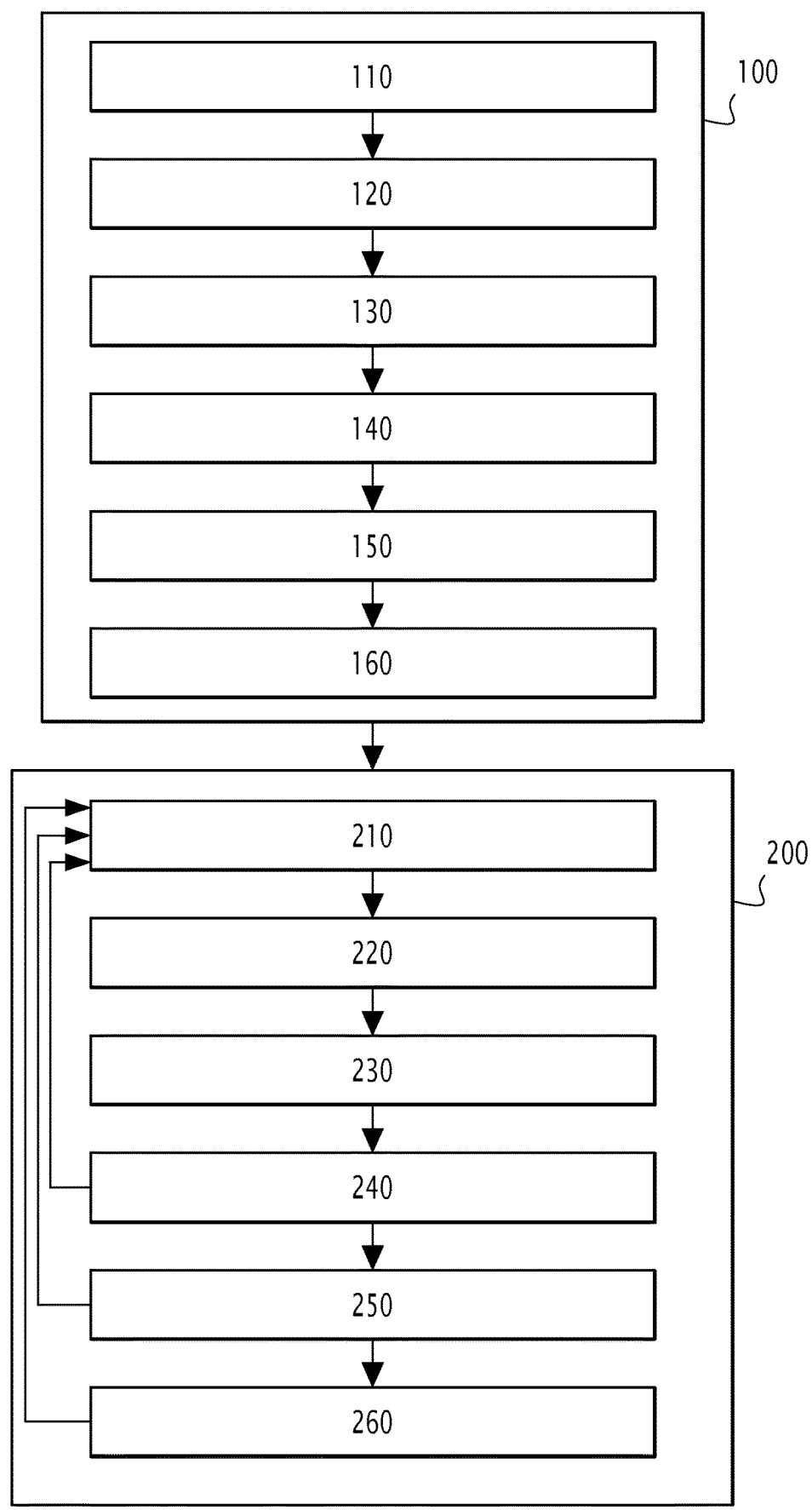

Other features and advantages of the invention will appear upon reading the following description which follows embodiments of the invention, given only as a limiting example, and making reference to the following drawings:

FIG. 1, a schematic representation of a platform comprising a device for assisting in the detection of elements, FIG. 2, a flowchart of an example of implementation of a method for assisting in the detection of examples, and FIG. 3, a schematic representation of an example of the scanning of the environment performed by a sensor of the device for assisting in detection for acquiring a series of first narrow-field images.

A platform 10 is shown in FIG. 1. In this example, the platform 10 is a land vehicle, in particular an all-terrain vehicle. Such a vehicle is e.g. controlled by an operator inside the vehicle. As a variant, such a vehicle is e.g. remotely controlled from another vehicle.

Advantageously, the platform 10 is a military vehicle, such as an assault tank. Such a military vehicle is in particular, suitable for including a plurality of weapons and for protecting the operator or operators installed inside the vehicle.

As a variant, the platform 10 is any other mobile platform, such as an aircraft (airplane, helicopter, drone or satellite) or a maritime vehicle (naval vessel).

Also in a variant, the platform 10 is a fixed platform, such as a turret or a control tower.

The platform 10 comprises a device 12 for assisting in the detection of elements E in an environment. The device 12 is suitable for assisting an operator in detecting the elements E in the environment.

Preferentially, the elements E are chosen from the list consisting of: a human, an animal, a weapon system, a land vehicle, a maritime vehicle and an aircraft.

More precisely, for human elements E, the distinction is made, e.g., between an unarmed human, a human armed with a light weapon and a human armed with a heavy weapon.

For the land vehicle elements E, a distinction is made e.g. between an unarmed civilian vehicle (car, truck, motorcycle), an armed civilian vehicle (all-terrain vehicle with turret) and a military vehicle (tank, logistics truck, troop transport vehicle, reconnaissance vehicle), even a military vehicle of a specific type (Leclerc tank, Challenger tank, T72 tank).

For the aircraft elements E, a distinction is made e.g. between a defined aircraft flying element, a defined helicopter flying element, a defined drone flying element, and a defined armed drone flying element. Furthermore, distinction is further made between a defined flying bird (animal) element and an aircraft.

For maritime vehicle elements E, distinction is made e.g. between an unarmed civilian ship, an armed civilian ship, a military ship of a specific type, and a submarine.

The elements E to be detected are both stationary (e.g.: a stopped vehicle) and mobile (e.g.: a human or vehicle in motion).

In a military context, the element E indicates the presence of a potential threat to the operators of the platform 10 or to any other operator within a platform that platform 10 is expected to watch.

In the example shown in FIG. 1, two elements E are represented: a first unarmed human element E1 and a second human armed with a light weapon element E2. In this example, the environment is a forest environment.

The device 12 for assisting in detection comprises an image acquisition system 14, a computer 16, and a display 18.

The image acquisition system 14 is suitable for capturing images of a part of the environment of the platform 10.

The image acquisition system 14 is e.g. suitable for capturing a set of images at a low frame rate so as to obtain a series of still images like with a camera or at a higher frame rate so as to acquire enough images to form a video stream.

The image acquisition system 14 is e.g. suitable for providing a video stream e.g. in HD-SDI video format. The acronym HD refers to high definition. HD-SDI (High Definition—Serial Digital Interface) is a protocol for transporting or broadcasting the different digital video formats. The HD-SDI protocol is defined by the standard ANSI/SMPTE 292M. The HD-SDI protocol is particularly suitable for real-time image processing.

As a variant, the image acquisition system 14 is suitable for providing a video stream in another standard, e.g. a video stream in CoaxPress format or a video stream in compressed Ethernet format e.g in the H264 or H265 standard.

Advantageously, the image acquisition system 14 is suitable for taking color images for daytime vision and/or for taking infrared images for night vision and/or for taking images for decamouflaging at night and during the day.

In the example shown in FIG. 1, the image acquisition system 14 comprises a first sensor 14A and a second sensor 14B.

The first sensor 14A is capable of acquiring images, called wide-field images.

The first sensor 14A has a first field of view and a first resolution.

The field of view of a sensor, also called angle-of-view, is the entire zone of space that the sensor perceives when the system fixes on a point.

The resolution of a sensor is defined as the elementary angular resolution, also known as the Instantaneous Field of View, (abbreviated as IFOV) expressed in milliradian (mrad). It is an aperture angle measure for determining the area covered by a pixel when the sensor observes a surface at a given distance. The elementary angular resolution is thus the field of view of a single pixel of the sensor. Knowledge of the elementary angular resolution of a sensor allows the overall resolution capacity of the sensor to be deduced.

Advantageously, the first field of view is greater than or equal to 130 degrees) (°, preferentially equal to 360° such that the images obtained by the first sensor 14A are panoramic images. The first resolution is e.g. less than or equal to 1 milliradian (mrad).

A sensor is called panoramic when the sensor is apt to provide images of the environment over 360°. The elevation is then e.g. between 75° and −15°. Such a panoramic sensor is e.g. formed by a single camera, such as a fisheye camera. In a variant, such a panoramic sensor is formed by a set of cameras.

In the example shown in FIG. 1, the first sensor 14A is fixed. In a variant, the first sensor 14A is orientable.

The second sensor 14B is suitable for acquiring so-called narrow-field images. The second sensor 14B has a second field of view and a second resolution. The second field of view is strictly less than the first field of view. The second resolution is finer (more accurate, better) than the first resolution, i.e. the instantaneous angular resolution of the second sensor 14A is strictly less than the instantaneous angular resolution of the first sensor 14B (a pixel of the second sensor 14B thus covers a zone of space which is smaller than a pixel of the first sensor 14A, hence a better resolution for the second sensor 14B).

The second field of view is e.g. less than or equal to 90°, preferentially less than or equal to 10°. The second resolution is e.g. less than or equal to 0.1 mrad.

The second sensor 14B is orientable (e.g. in elevation and in bearing) so as to adjust the orientation of the sensor. As shown e.g. in FIG. 1, the second sensor 14B is mounted on a member 19, such as a cupola, allowing the second sensor 14B to be oriented.

In a variant or in addition, the second sensor 14B is a pan tilt camera, i.e. a camera which can be oriented in elevation and in bearing. Such a camera is, if appropriate, equipped with a zoom.

The computer 16 is in particular, configured for operating a classifier and, where appropriate, a motion detection tool.

The computer 16 has e.g. a processor. The computer 16 comprises e.g. a data processing unit, memories, an information medium reader and a human/machine interface.

The computer 16 is e.g. in interaction with a computer program product which includes an information medium.

The information medium is a medium readable by the computer 16, usually by the data processing unit of the computer 16. The computer-readable medium is a medium suitable for storing electronic instructions and apt to be coupled to a bus of a computer system. As an example, the readable information medium is a USB key, a diskette or a floppy disk, an optical disk, a CD-ROM, a magneto-optical disk, a ROM, a RAM, an EPROM, an EEPROM, a magnetic card or an optical card. The computer program product containing program instructions is stored on the information medium.

Advantageously, at least one classifier and, where appropriate, at least one motion detection tool are stored on the information medium. In a variant, the classifier and the motion detection tool are stored in a memory of the computer 16.

The classifier, also called a classification tool hereinafter in the description, is configured for detecting and, optionally, classifying elements E. Classification consists of assigning a class to each detected element E. The possible classes are e.g. general classes such as e.g. the "human" class, the "animal" class, the "weapon system" class, the "land vehicle" class, the "maritime vehicle" class and the "aircraft" class. Advantageously, the classes are more precise classes, e.g. in accordance with the distinctions between the elements E which have been described above.

Advantageously, the classifier has been trained beforehand, off mission, as a function of a database of images comprising images of the elements E to be detected. The classifications stored in such databases were e.g. obtained via an operator or another classification tool, in particular during the post-mission analysis of a previous reconnaissance mission.

The classifier comprises in particular at least one algorithm for detecting elements E and an algorithm for classifying elements E. The classifier is e.g. a neural network which has been previously "trained" via the image database comprising images of the elements E to be detected. Advantageously, the learning or "training" phase is not carried out in the vehicle, but outside of the mission.

The motion detection tool, also referred to as the motion detector hereinafter in the description, is configured for detecting moving elements E based on images acquired in the previous moments. The motion detection tool comprises in particular a motion detection algorithm. The motion detection tool is e.g. an algorithm based on the optical flow method.

The computer program can be loaded into the data processing unit and is suitable for implementing a method for assisting in the detection of elements E when the computer program is implemented on the processing unit of the computer 16 as will be described hereinafter in the description.

In a variant, at least a part of the computer 16 is integrated into one or a plurality of the sensors of the acquisition system 14 so as to form so-called smart sensors.

In a variant, at least a part of the computer 16 is offset from the platform 10, the data transmissions taking place e.g. wirelessly, if the computing power of the processor integrated into the platform is too low.

The display 18 is, according to the example shown in FIG. 1, a screen suitable for displaying images to the operator, e.g. the images coming from the acquisition system 14 or the same images after processing by the computer 16.

In a variant, the display 18 forms an integral part of the computer 16, e.g. of the human-machine interface of the computer 16.

An example of operation of the device 12 for assisting in detection will now be described with reference to the implementation by the computer 16 of a method for assisting in the detection of elements E in an environment. Such an implementation is illustrated by the flowchart shown in FIG. 2.

Advantageously, the method is implemented in real time, i.e. at every moment.

The method comprises an initialization phase 100 and an operating phase 200.

Optionally, the initialization phase 100 is repeated at predefined time intervals.

The initialization phase 100 comprises a step 110 of acquiring a first wide-field image IMGC1 of a first part of the environment by the first sensor 14A.

The initialization phase 100 comprises a step 120 of performing a scanning of the environment by the second sensor 14B so as to acquire a series of first narrow-field images IMPC1. The first IMPC1 narrow-field images, image second parts of the environment with the second resolution.

The scanning is performed so that the first IMPC1 narrow-field images obtained, image different second parts of the environment so that all the second parts of the environment imaged by the first IMPC1 narrow-field images correspond to the first part of the environment imaged by the first wide-field image IMGC1 (environment seen according to the first field of view of the first sensor 14A).

FIG. 3 shows an example of the scanning of the environment performed by the second sensor 14B and of the first narrow-field images IMPC1 obtained at the end of the scanning.

In the example shown in FIG. 3, the second parts of the environment imaged by the first IMPC1 narrow-field images do not overlap. In a variant, the first narrow-field images IMPC1, image overlapping parts of the environment.

The initialization phase 100 comprises a step 130 of generating, by the computer 16, a fused image IMF from the series of first narrow-field images IMPC1. The fused image MFP is e.g. obtained by the fusion of the first narrow-field images IMPC1.

The portion of the environment imaged on the fused image IMF thus corresponds to the portion of the environment imaged by the first wide-field image IMGC1. Thus, the fused image IMF images the first part of the environment according to the first field of view, but with a resolution equal to the second resolution ("wide" field and "high" resolution).

The fused image IMF is stored in a memory of the computer 16.

Optionally, the initialization phase 100 comprises a step 140 of detecting, where appropriate, elements E imaged on the first wide-field image IMGC1 and/or on the fused image IMF using the classification tool (detection algorithm as previously described and to which the computer 16 has access).

Optionally, the initialization phase 100 comprises a step 150 of classifying each detected element E using the classification tool (classification algorithm as previously described and to which the computer 16 has access).

Preferentially, each classification is associated with a probability representative of a level of confidence in the classification. The classification probability is determined by the classification tool.

Optionally, the initialization phase 100 comprises a step 160 of displaying the fused image IMF. The display step 160 is e.g. implemented in real time by the display 18.

Advantageously, the detected elements E are emphasized on the fused image IMF by a symbol, conventionally a rectangle or a closed curved line encircling the element E as closely as possible.

Advantageously, at the request of the operator, the pixels corresponding to the detected element(s) E are emphasized on the fused image IMF displayed, e.g. by color change or increased brightness. In this way, the operator can verify that the pixels of the element E were used for the classification and not the pixels of the context.

Furthermore, the classification of the elements E is e.g. displayed on the image, as well as, advantageously, the probability associated with the classification (level of confidence in the classification). In this way, the operator can verify a classification associated with an unsatisfactory probability, typically below a predetermined threshold (e.g. less than 80%).

After the initialization phase, the operating phase takes place, the different steps of which are repeated at every moment.

The operating phase 200 comprises a step 210 of acquisition, by the first sensor 14A, of a second wide-field image IMGC2. The second wide-field image IMGC2 images the first part of the environment (first field of view of the first sensor 14A) with a resolution equal to the first resolution.

The operating phase 200 comprises a step 220 of detecting on the second wide-field image IMGC2, at least one difference relating to an element E compared to the wide-field image acquired at the preceding moment (first wide-field image IMGC1 when the detection step 220 takes place just after an initialization phase or otherwise second wide-field image IMGC2 acquired at the precedent moment). The detection step 220 thus performs a comparison between the second wide-field image IMGC2 and the wide-field image acquired at the precedent moment.

The step 220 can thus be used for detecting elements E which have just appeared in the environment, and/or for detecting mobile elements E (which possibly would not be well detected on the fused image IMF even if same were refreshed, because of the low refresh rate of the fused image IMF).

The detection step 220 is e.g. performed by means of the classification and motion detection tools of the computer 16.

The operating phase 200 comprises a step 230 of acquisition, by the second sensor 14B, for each detected difference, of a second narrow-field image IMPC2 imaging the difference with a second resolution. To this end, the second sensor 14B is oriented in the direction of the detected difference, e.g. by means of the cupola 19 shown in FIG. 1. The second narrow-field image IMPC2 is thus an image of a second part of the environment (thus according to the second field of view of the second sensor 14B) with a resolution equal to the second resolution.

The operating phase 200 comprises, for each detected difference, a step 240 of updating, by the computer 16, of the corresponding part of the fused image IMF with the corresponding second narrow-field image IMPC2.

E.g. the update of the fused image IMF comprises the insertion of the second narrow-field image IMPC2 instead of the portion of the fused image IMF imaging the same field of view as said second narrow-field IMPC2.

Advantageously, each second narrow-field image IMPC2 inserted in the fused image IMF is associated with a date of acquisition of said second narrow-field image IMPC2, the date of acquisition being stored in the computer 16.

Advantageously, the second wide-field image IMGC2 is acquired with a refresh rate making a continuous observation possible of the wide-field (high frame rate). Such a refresh rate is e.g. equal to about ten images per second.

Advantageously, when at least two differences corresponding to different moving elements E are detected, the corresponding second narrow-field IMPC2 images are acquired over time following the same order. The fused image IMF is updated by the second narrow-field images IMPC2 according to the order of acquisition of said second narrow-field images IMPC2. The order is e.g. determined according to the criticality level of the detected elements E. In particular, a priority algorithm can be used taking into account the assumed dangerousness of element E.

Advantageously, when a difference is detected on the second wide-field image IMGC2 compared to the fused image IMF, the updating step 240 comprises the update of the fused image IMF with the second wide-field image IMGC2, the time for the second sensor 14B to acquire the corresponding second narrow-field image IMPC2, and for the computer 16 to update the fused image IMF with the second narrow-field image IMPC2. In this way, the operator can follow the detected elements E.

Optionally, the operating phase 200 comprises a step 250 of classifying each detected difference (corresponding to an element E) using the classification tool (classification algorithm as previously described and to which the computer 16 has access).

Preferentially, each classification is associated with a probability representative of a level of confidence in the classification. The classification probability is determined by the classification tool.

Optionally, the operating phase 200 comprises a step 260 of displaying on the display 18, the last version of the fused image IMF.

Advantageously, the detected elements E are emphasized on the fused image IMF by a symbol, conventionally a rectangle or a closed curved line encircling the element E as closely as possible.

Advantageously, at the request of the operator, the pixels corresponding to the detected element(s) E are emphasized on the fused image IMF displayed, e.g. by color change or increased brightness. In this way, the operator can verify that the pixels of the element E were used for the classification and not the pixels of the context.

Furthermore, the classification of the elements E is e.g. displayed on the image, as well as, advantageously, the probability associated with the classification. In this way, the operator can verify a classification associated with an unsatisfactory probability, typically below a predetermined threshold (e.g. less than 80%).

Advantageously, the age or date of acquisition of each second narrow-field image IMPC2 inserted in the fused image IMF is displayed on the fused image IMF.

Thus, such a method for assisting in detection can be used for combining the advantages of a wide-field and low-resolution sensor and a narrow-field and high-resolution sensor. In particular, the method makes it possible to benefit from an extended surveillance field with a high resolution which can be used for identification (automatic or via an operator), typically to benefit from the resolution of the narrow-field-high resolution sensor throughout the field of the wide-field-low-resolution sensor. At the end of the method, an updated image of the environment with a large field of view and a high resolution is thus obtained. Furthermore, the update of the fused image IMF at every moment, provides permanent surveillance.

Thus, the method for assisting in detection makes it possible to obtain a wide-field image having a resolution compatible with automatic target recognition and identification while maintaining a permanent surveillance. A better detection of the elements E of an environment is thus possible, and in particular of threats in a military context.

Such a method is particularly suitable for being implemented in a military vehicle (armored, for transport) the missions of which in dangerous zones require vigilance at all times and in all directions.

In particular, the method makes it possible to automatically present and collect a tactical local situation around the vehicle, presenting in real time, all the threats detected and, where appropriate, automatically classified by a learning classification tool. Such threats are likely to occur during reconnaissance missions, but also during transport or attack missions. Such a method thus makes it possible to carry out an automatic and vigilant watch over the environment.

A person skilled in the art will understand that the order of the steps of the method is given as an example and that the steps can be implemented in a different order.

A person skilled in the art will understand that the embodiments and variants described above can be combined so as to form new embodiments provided that same are technically compatible.

Furthermore, it should be noted that, in an optional addition, the image acquisitions performed by each sensor are performed in a plurality of spectral bands, e.g. visible spectral band (comprised between 380 nm and 780 nm) and infrared spectral band (comprised between 780 nm and 3 μm and/or between 3 μm and 5 μm and/or between 8 μm and 12 μm). In this way, at night access is possible to the recorded color image of day.

The invention claimed is:

1. A method for assisting in the detection of elements in an environment, the method being implemented by a detection assistance device comprising an image acquisition system and a computer, the image acquisition system comprising a first sensor and a second orientable sensor, the first sensor having a first field of view and a first resolution and being suitable for acquiring so-called wide-field images, the second sensor having a second field of view and a second resolution and being suitable for acquiring so-called narrow-field images, the second field of view being strictly less than the first field of view, the second resolution being finer than the first resolution, the method comprising:
   an initialization phase comprising:
   i. the acquisition by the first sensor of a first wide-field image of a first part of the environment,
   ii. scanning the environment by the second sensor so as to acquire a series of first narrow-field images imaging different second parts of the environment so that all of the second parts of the environment imaged by the first narrow-field images correspond to the first part of the environment imaged by the first wide-field image,
   iii. the generation, by the computer, of a fused image from the series of first narrow-field images, the fused image imaging the first part of the environment with a resolution equal to the second resolution,
   an operating phase comprising at each moment:
   i. the acquisition by the first sensor of a second wide-field image of the first part of the environment,
   ii. in response to the detection of at least one difference relating to an element on the second wide-field image with respect to the wide-field image acquired at the previous moment, the acquisition by the second sensor, for each difference detected, of a second narrow-field image imaging the difference with the second resolution, and
   iii. for each detected difference, the update by the computer, of the corresponding part of the fused image with the corresponding second narrow-field image.

2. The method according to claim 1, wherein the device for assisting in detection, comprises a display, the method comprising a step of displaying the fused image on the display according to the last update of said fused image.

3. The method according to claim 1, wherein when a difference is detected on the second wide-field image with respect to the previously acquired wide-field image, the update comprises the update of the fused image with the second wide-field image, the time for the second sensor to acquire the corresponding second narrow-field image, and for the computer to update the fused image with said second narrow-field image.

4. The method according to claim 1, wherein the update of the fused image comprises the insertion of the second narrow-field image instead of the portion of the fused image imaging the same field of view as said second narrow-field image.

5. The method according to claim 4, wherein each second narrow-field image inserted into the fused image is associated with a date of acquisition of the second narrow-field image, the date of acquisition being stored in the computer.

6. The method according to claim 1, wherein when at least two differences corresponding to two different moving elements are detected, the corresponding second narrow-field images are acquired over time following the same order, the fused image being updated by the second narrow-field images according to the order of acquisition of said second narrow-field image.

7. The method according to claim 1, wherein the initialization phase comprises, where appropriate, the detection by the computer, of elements imaged on the fused image and/or on the first wide-field image and the classification, by the computer, of the detected elements.

8. The method according to claim 1, wherein the operating phase comprises the classification by the computer, of the elements corresponding to the differences identified on the second wide-field image.

9. A device for assisting in the detection of elements in an environment, the device comprising:
- an image acquisition system comprising a first sensor and a second orientable sensor, the first sensor having a first field of view and a first resolution and being suitable for acquiring so-called wide-field images, the second sensor having a second field of view and a second resolution and being suitable for acquiring so-called narrow-field images, the second field of view being strictly less than the first field of view, the second resolution being finer than the first resolution, the image acquisition system being configured for implementing at least the steps of acquiring a first wide-field image, of performing a scan, of acquiring a second wide-field image and of acquiring a second narrow-field image, and
- a computer configured for implementing the steps of generating a fused image, detecting differences and updating the method according to claim 1.

10. The device according to claim 9, wherein the first sensor and the second sensor are each suitable for acquiring the corresponding images in at least two different spectral bands.

11. The device according to claim 10, wherein the two different spectral bands are the visible spectral band and the infrared spectral band.

12. A platform comprising the device according to claim 9.

13. The platform according to claim 12, wherein the platform is a mobile plateform.

* * * * *